Patented July 10, 1934

1,965,760

UNITED STATES PATENT OFFICE 1,965,760

FLUX WASH FOR GALVANIZING

Allen T. Baldwin, Montclair, N. J., assignor to Hanson-Van Winkle-Munning Company, Matawan, N. J., a corporation of New Jersey No Drawing. Application March 23, 1932, Serial No. 600,837

8 Claims. (Cl. 148—23)

This invention relates to flux washes for galvanizing, as used for example for final preparation of the metal just prior to its being introduced into the hot dip galvanizing kettle.

Various types of flux washes are in common use, some of which employ a dilute solution of hydrochloric acid in water, and others employ solutions of salammoniac or zinc ammonium chloride. While these examples do not represent all the various types employed, they will be sufficient to illustrate the general character of such flux washes.

The general purpose of a flux wash is to wet the metal surface with a film of suitable material to properly condition the surface in preparation for the introduction of the work into the molten zinc. Such flux washes are used at varying temperatures from room temperature to the boiling point of the solution, and different plants have their individual preferences as to the temperature and concentration of the flux wash. Higher temperatures tend to reduce "spitting" at the point of contact of the work with the hot zinc or the flux blanket. Since the flux wash is usually of acid reaction, due regard must be had to the various factors which bear on the subject of surface corrosion. Among these may be mentioned concentrations, temperature, degree of acidity and the time ensuing between the moment when the work leaves the flux wash and the moment when it enters the galvanizing kettle.

The object of the present invention is to improve the character and action of the flux wash not only with respect to the preparation of the work for introduction into the galvanizing kettle, but also with a view to maintaining a highly favorable environment at the point of introduction of the work into the molten zinc. In one important form of the invention the flux wash serves not only the functions of preparing the metal prior to its introduction into the zinc kettle, but also continuously produces and maintains at the point of introduction a frothy flux blanket due to certain materials carried by the work surface from the flux wash into the galvanizing kettle. Indeed, the flux wash may be so constituted, in accordance with my invention, that all ingredients essential to the production and maintenance of a frothy flux blanket may be continuously supplied from the flux wash itself; and in this, a preferred form of the invention, the flux wash comprises an aqueous solution of a suitable fluxing compound, such as salammoniac, zinc ammonium chloride, or the like, and a frothing agent which has the property of reducing surface tension and increasing viscosity so that the solution is better able to wet the work surface and to be carried thereby in the form of a film into the molten zinc, where it is driven off and produces the flux blanket in the form of a good stable puffy blanket. By continuously producing the flux at the point where its action upon the work surface is required, and continuously, though very gradually, renewing the flux at this point, the work is at all times maintained in a most favorable condition by a fresh and highly active material. At the same time, the receding froth or foam slowly spreads or flows toward the far end of the kettle, maintaining the protective blanket over the molten zinc surface, and eventually the spent flux may be removed at a point remote from the entry of the work.

Within the principles of my invention, many different compounds and materials may be employed. The particular composition of the flux wash will naturally depend on circumstances, and to a considerable extent on individual preference. If, for example, the operator prefers to make up his flux blanket on the zinc kettle in the old accustomed manner, the flux wash may comprise the usual dilute hydrochloric acid in water with an addition of a frothing agent such as glycerine, tallow, oatmeal, bran, soapbark or other glucosides such as licorice root, saponins, amygdalin, phloridzin, populin, salicin, soap wort roots and tannin, or a carbohydrate such as xylose, dextrose, cane sugar, galactose, lactose, maltose, corn starch or potato starch. In general, frothing agents which will dissolve, be suspended, or spread as a film on the flux wash, may be employed. The quantities are to a considerable extent optional, but one- or two-hundredths of a pound per gallon of liquid will be satisfactory.

In a preferred form of the invention, the flux wash will contain all the ingredients of the flux composition, such as salammoniac, zinc ammonium chloride or mixtures thereof, and a small amount of frothing agent such as any of those already enumerated. The frothing agent may represent from 1 to 2%, and the fluxing compound 98 or 99%, of the flux composition, and a suitable flux wash may be prepared from this by dissolving it in water in the proportion of, say, 1 to 3 pounds per gallon. Obviously, the particular proportions are not critical, and those stated may be increased or reduced. A typical example of a fluxing composition to be dissolved in the preparation of the flux wash is as follows:—

Zinc ammonium chloride ($Zn(NH_4)_2Cl_4$ or $Zn(NH_4)_3Cl_5$), 98 pounds. Soapbark, 2 pounds.

Such material dissolved in water in the proportion of 1 to 3 pounds per gallon has given satisfactory results on various kinds of work, with the flux wash being maintained at varying temperatures from room temperature to the boiling point of the solution, and has been found to fully supply and maintain the flux blanket on the zinc kettle merely by the "drag-out" carried by the work from the flux wash to the galvanizing kettle. The work from such a flux wash does not show surface corrosion, "spitting" is substantially eliminated, clean bright deposits are obtained, and little or no attention to the flux blanket itself is required other than to occasionally remove spent flux at a point remote from the entry of the work into the zinc kettle.

I have attempted to point out that the invention is not limited to the use of specific materials, but comprehends the principle of coaction of materials having their prescribed functions regardless of what the particular materials may be. The reduction of surface tension and increase in viscosity enables the flux wash to better wet and cling to the work surface. The same material which produces those effects serves also as a frothing agent or froth stabilizer in the flux blanket maintained on the molten zinc. The hydrochloric acid, salammoniac, zinc ammonium chloride or the like, prepares the work surface prior to delivery of the work to the zinc kettle, and in the case of salts such as those mentioned may also serve as the fluxing compound in which the froth is produced on the molten zinc. The invention may thus be regarded as providing a new method of producing and maintaining galvanizing fluxes, as well as providing a new and improved flux wash.

I claim:—

1. A flux wash for application to a metal prior to galvanizing, comprising an aqueous bath containing fluxing material selected from the group consisting of ammonium chloride, zinc chloride and zinc ammonium chloride, and a flux frothing ingredient selected from the group consisting of glucosides, tallow, glycerine and carbohydrates.

2. A flux wash for application to a metal prior to galvanizing, comprising an aqueous bath containing fluxing material selected from the group consisting of ammonium chloride, zinc chloride and zinc ammonium chloride, and a glucoside.

3. A flux wash for application to a metal prior to galvanizing, comprising an aqueous bath containing fluxing material selected from the group consisting of ammonium chloride, zinc chloride and zinc ammonium chloride, and a carbohydrate.

4. A flux wash for application to a metal prior to galvanizing, comprising an aqueous bath containing fluxing material selected from the group consisting of ammonium chloride, zinc chloride and zinc ammonium chloride, and soapbark.

5. A flux wash for application to a metal prior to galvanizing, comprising an aqueous bath containing zinc ammonium chloride and a flux frothing ingredient selected from the group consisting of glucosides, tallow, glycerine and carbohydrates.

6. A flux wash for application to a metal prior to galvanizing, comprising an aqueous bath containing zinc ammonium chloride and a glucoside.

7. A flux wash for application to a metal prior to galvanizing, comprising an aqueous bath containing zinc ammonium chloride and a carbohydrate.

8. A flux wash for application to a metal prior to galvanizing, comprising an aqueous bath containing zinc ammonium chloride and soapbark.

ALLEN T. BALDWIN.